(12) United States Patent
Jang et al.

(10) Patent No.: US 10,318,469 B2
(45) Date of Patent: Jun. 11, 2019

(54) SEMICONDUCTOR MEMORY DEVICE, MEMORY SYSTEM, AND METHOD USING BUS-INVERT ENCODING

(71) Applicant: SAMSUNG ELECTRONICS CO., LTD., Suwon-si, Gyeonggi-Do (KR)

(72) Inventors: Min-Soo Jang, Seoul (KR);
Gong-Heum Han, Hwaseong-si (KR);
Chul-Sung Park, Seoul (KR);
Jang-Woo Ryu, Seoul (KR);
Chang-Yong Lee, Hwaseong-si (KR);
Tae-Seong Jang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 320 days.

(21) Appl. No.: 14/620,219

(22) Filed: Feb. 12, 2015

(65) Prior Publication Data
US 2015/0242352 A1    Aug. 27, 2015

(30) Foreign Application Priority Data

Feb. 24, 2014    (KR) .......................... 10-2014-0021092

(51) Int. Cl.
*G06F 13/36*    (2006.01)
*G06F 13/42*    (2006.01)

(52) U.S. Cl.
CPC ...... *G06F 13/4273* (2013.01); *G06F 13/4243* (2013.01); *Y02D 10/14* (2018.01); *Y02D 10/151* (2018.01)

(58) Field of Classification Search
CPC .......................... G06F 13/4243; G06F 13/4273

USPC ......................................................... 710/310
See application file for complete search history.

(56) References Cited

U.S. PATENT DOCUMENTS

| 7,280,053 B2 | 10/2007 | Hori |
| 7,280,412 B2 | 10/2007 | Jang et al. |
| 7,423,914 B2 | 9/2008 | Kwack et al. |
| 7,495,587 B2 | 2/2009 | Bae |
| 7,986,251 B2 | 7/2011 | Bae et al. |
| 8,094,045 B2 * | 1/2012 | Hollis ................ G06F 13/4234 341/50 |
| 2003/0182603 A1 * | 9/2003 | Gass ..................... H04L 1/0045 714/712 |
| 2010/0042889 A1 * | 2/2010 | Hargan ................ G06F 11/1625 714/752 |
| 2011/0156934 A1 | 6/2011 | Bae et al. |
| 2013/0091327 A1 | 4/2013 | Shido et al. |

FOREIGN PATENT DOCUMENTS

| JP | 5077806 B | 9/2012 |
| JP | 2012257066 A | 12/2012 |

* cited by examiner

*Primary Examiner* — Chun Kuan Lee
(74) *Attorney, Agent, or Firm* — Volentine, Whitt & Francos, PLLC

(57) ABSTRACT

A semiconductor memory device comprises a memory cell array and a data inversion circuit. The data inversion circuit is configured to receive a first unit data and a second unit data stored in the memory cell array through different first data lines, determine, while the first unit data is transmitted to a data input/output (I/O) buffer through a second data line, whether to the invert the second unit data based on a Hamming distance between the first unit data and the second unit data, and transmit the inverted or non-inverted second unit data to the data I/O buffer through the second data line.

17 Claims, 13 Drawing Sheets

SEMICONDUCTOR MEMORY DEVICE, MEMORY SYSTEM, AND METHOD USING BUS-INVERT ENCODING

CROSS-REFERENCE TO RELATED APPLICATION

This application claims priority under 35 USC § 119 to Korean Patent Application No. 10-2014-0021092 filed on Feb. 24, 2014, the subject matter of which is hereby incorporated by reference.

BACKGROUND OF THE INVENTION

The inventive concept relates generally to electronic memory technologies. More particularly, the inventive concept relates to semiconductor memory devices, systems, and methods using bus-invert encoding.

Semiconductor memory devices are typically connected to a processor or controller through a bus. When data is transmitted across the bus, power dissipation may vary according to bit transitions between sequential data. Accordingly overall power consumption may vary depending on the pattern of data being transmitted.

In an effort to address the impact of data patterns on power consumption, researchers have developed various techniques for encoding data to be transmitted across a bus. The encoding is designed to produce data patterns that reduce power consumption. One example of such an encoding technique is so-called bus-invert encoding, which inverts data bits to reduce the number of state transitions between sequentially transmitted data bits.

SUMMARY OF THE INVENTION

In one embodiment of the inventive concept, a semiconductor memory device comprises a memory cell array, and a data inversion circuit. The data inversion circuit is configured to receive a first unit data and a second unit data stored in the memory cell array through different first data lines, determine, while the first unit data is transmitted to a data input/output (I/O) buffer through a second data line, whether to the invert the second unit data based on a Hamming distance between the first unit data and the second unit data, and transmit the inverted or non-inverted second unit data to the data I/O buffer through the second data line.

In another embodiment of the inventive concept, a memory system comprises at least one semiconductor memory device, and a memory controller configured to control the at least one semiconductor memory device. The at least one semiconductor memory device comprises a memory cell array and a data inversion circuit.

In another embodiment of the inventive concept, a method of operating a memory device comprises receiving a first unit data and a second unit data stored in a memory cell array through different first data lines, determining, while the first unit data is transmitted to a data I/O buffer through a second data line, whether to the invert the second unit data based on a Hamming distance between the first unit data and the second unit data, and transmitting the inverted or non-inverted second unit data to the data I/O buffer through the second data line.

These and other embodiments of the inventive concept can potentially improve power consumption without unduly impeding performance by performing certain operations of bus-invert encoding in an overlapping fashion.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

In the description that follows, terms such as first, second, third etc. may be used to describe various features, but the described features should not be limited by these terms. Rather, these terms are used to distinguish one feature from another. Thus, a first feature discussed below could be termed a second feature without departing from the teachings of the present disclosure. As used herein, the term "and/or" includes any and all combinations of one or more of the associated listed items. Where a feature is referred to as being "connected" or "coupled" to another feature, it can be directly connected or coupled to the other element or intervening features may be present.

The terminology used herein is for the purpose of describing particular embodiments only and is not intended to limit the inventive concept. As used herein, the singular forms "a," "an" and "the" are intended to include the plural forms as well, unless the context clearly indicates otherwise. Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

As used herein, the term "unit data" refers to a unit of data comprising at least two bits. The term "Hamming distance" refers to a number of corresponding positions at which two different units of data have different bit values.

Figure 1:
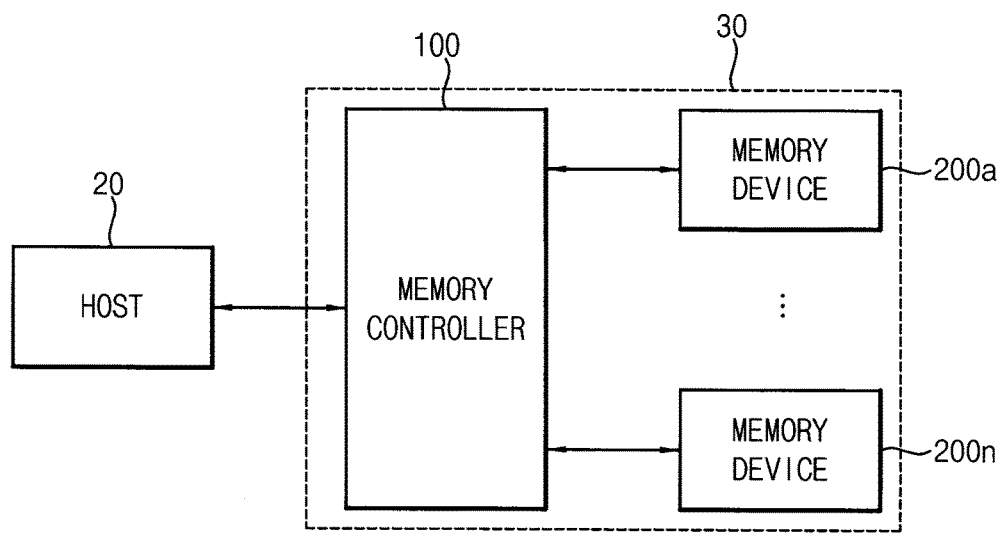
FIG. 1 is a block diagram illustrating an electronic system according to an embodiment of the inventive concept.

FIG. 1 is a block diagram illustrating an electronic system 10 according to an embodiment of the inventive concept.

Referring to FIG. 1, electronic system 10 comprises a host 20 and a memory system 30. Memory system 30 comprises a memory controller 100 and multiple semiconductor memory devices 200a~200n.

Host 20 may communicate with memory system 30 through one of various standard interface protocols such as Peripheral Component Interconnect-Express (PCI-E), Advanced Technology Attachment (ATA), Serial ATA (SATA), Parallel ATA (PATA), or serial attached SCSI (SAS). In addition, host 20 may communicate with memory system 30 through interface protocols such as Universal Serial Bus (USB), Multi-Media Card (MMC), Enhanced Small Disk Interface (ESDI), or Integrated Drive Electronics (IDE).

Memory controller 100 controls overall operation of memory system 30. Memory controller 100 controls overall data exchange between host 20 and the semiconductor memory devices 200a~200n. For example, memory controller 100 writes data in the semiconductor memory devices 200a~200n or reads data from the semiconductor memory devices 200a~200n in response to request from host 20. In addition, memory controller 100 issues commands to the semiconductor memory devices 200a~200n for controlling semiconductor memory devices 200a~200n.

Each of semiconductor memory devices 200a~200n may be, for example, a dynamic random access memory (DRAM), such as a double data rate synchronous dynamic random access memory (DDR SDRAM), a low power double data rate synchronous dynamic random access memory (LPDDR SDRAM), a graphics double data rate synchronous dynamic random access memory (GDDR SDRAM), or a Rambus dynamic random access memory (RDRAM).

Figure 2:
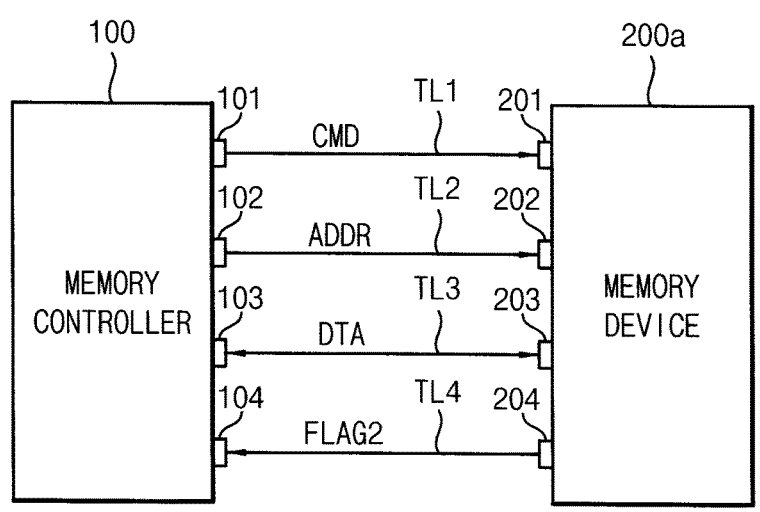
FIG. 2 is a block diagram illustrating an example of a memory system in FIG. 1 according to an embodiment of the inventive concept.

FIG. 2 is a block diagram illustrating an example of the memory system 30 in FIG. 1 to an embodiment of the inventive concept. For convenience, FIG. 2 shows only one semiconductor memory device 200a in communication with memory controller 100. However, the details discussed in relation to semiconductor memory device 200a may apply to other semiconductor memory devices 200b~200n.

Referring to FIG. 2, memory system 30 comprises memory controller 100 and semiconductor memory device 200a. Each of memory controller 100 and semiconductor memory device 200a may be formed as a separate semiconductor chip or as a separate group of chips (e.g., semiconductor memory device 200a may a stack of semiconductor chips in a semiconductor package). Memory controller 100 and semiconductor memory device 200a may be connected to each other through corresponding command pins 101 and 201, corresponding address pins 102 and 202, corresponding data pins 103 and 203 and corresponding separate pins 104 and 204.

Command pins 101 and 201 transmit a command signal CMD through a command transmission line TL1, address pins 102 and 202 transmit an address signal ADDR through an address transmission line TL2, data pins 103 and 203 exchange data block DTA through a data transmission line TL3 and the separate pins 104 and 204 transmit a second flag signal FALG2 through a separate transmission line TL4. As will be described below, second flag signal FLAG2 indicate whether each of multiple unit data in data block DTA is inverted or not.

Referring to FIGS. 1 and 2, memory controller 100 transmits data to semiconductor memory device 200a and receives data from semiconductor memory device 200a through data pins 103 and 203 based on the request from host 20. In addition, semiconductor memory device 200a receives addresses from memory controller 100 through address pins 102 and 202. In addition, memory controller 100 receives second flag signal FLAG2 from semiconductor memory device 200a through the separate pins 104 and 204.

Separate pins 104 and 204 are data mask pins. In a write operation, memory controller 100 transmits a data mask signal to semiconductor memory device 200a through the separate pins 104 and 204. Semiconductor memory device 200a selectively performs masked write operation on each of multiple unit data. In addition, in read operation, memory controller 100 receives second flag signal FLAG2 from semiconductor memory device 200a through the separate pins 104 and 204.

Figure 3:
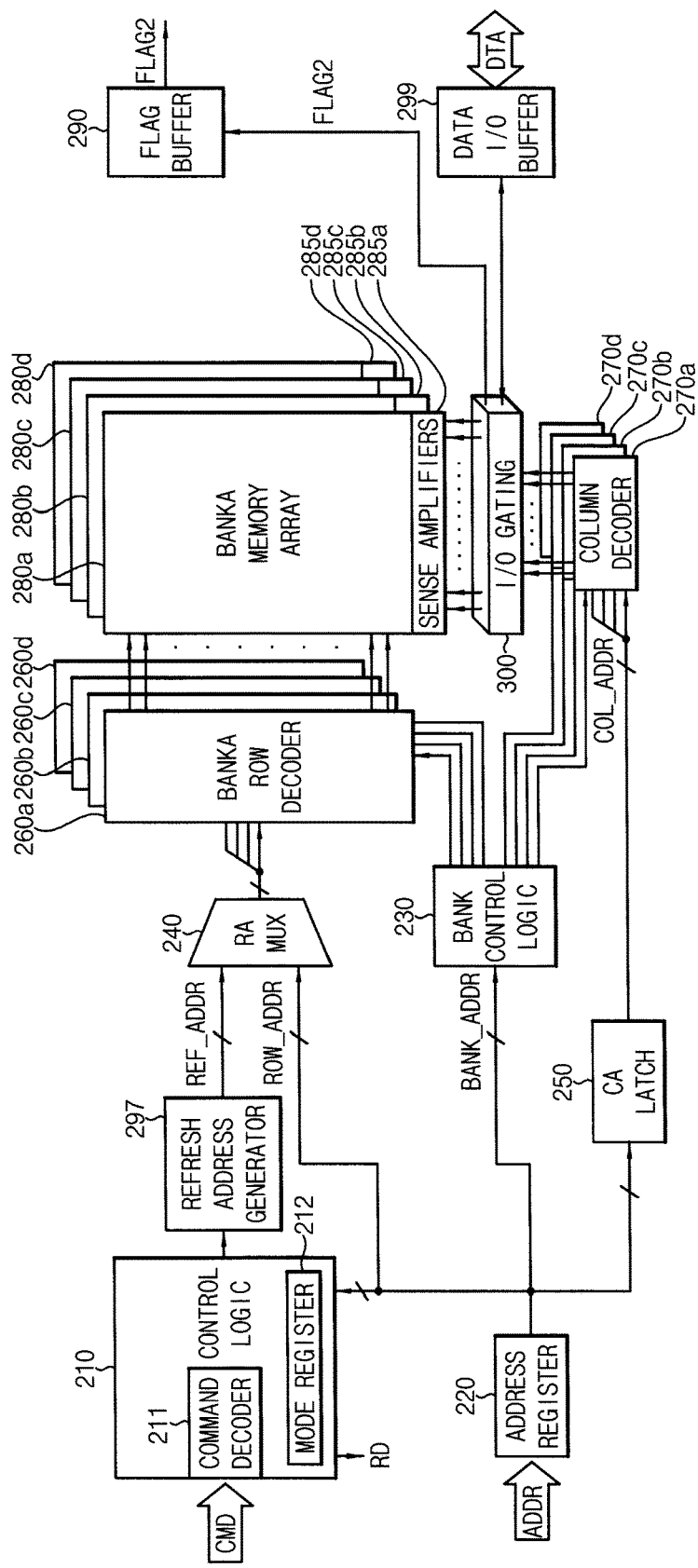
FIG. 3 is a block diagram illustrating an example of a semiconductor memory device in FIG. 2 according to an embodiment of the inventive concept.

FIG. 3 is a block diagram illustrating an example of the semiconductor memory device in FIG. 2 according to an embodiment of the inventive concept.

Referring to FIG. 3, semiconductor memory device 200a comprises a control logic 210, an address register 220, a bank control logic 230, a row address multiplexer 240, a column address latch 250, a row decoder, a column decoder, a memory cell array, a sense amplifier unit, an input/output (I/O) gating circuit 300, a data input/output (I/O) buffer 299, a flag buffer 290 and a refresh address generator 297.

The memory cell array comprises first through fourth bank arrays 280a, 280b, 280c and 280d. The row decoder comprises first through fourth bank row decoders 260a, 260b, 260c and 260d respectively coupled to first through fourth bank arrays 280a, 280b, 280c and 280d, the column decoder comprises first through fourth bank column decoders 270a, 270b, 270c and 270d respectively coupled to first through fourth bank arrays 280a, 280b, 280c and 280d, and the sense amplifier unit comprises first through fourth bank sense amplifiers 285a, 285b, 385c and 385d respectively coupled to first through fourth bank arrays 280a, 280b, 280c and 280d. First through fourth bank arrays 280a, 280b, 280c and 280d, first through fourth bank row decoders 260a, 260b, 260c and 260d, first through fourth bank column decoders 270a, 270b, 270c and 270d and first through fourth bank sense amplifiers 285a, 285b, 285c and 285d form first through fourth banks. Although semiconductor memory device 200a is illustrated in FIG. 3 with four banks, semiconductor memory device 200a may comprise any number of banks. Semiconductor memory device 200a may be, for instance, a DRAM, such as a DDR SDRAM, an LPDDR SDRAM, a GDDR SDRAM, or an RDRAM.

Address register 220 receives an address ADDR comprising a bank address BANK_ADDR, a row address ROW_ADDR and a column address COL_ADDR from a memory controller (not shown). Address register 220 provides the received bank address BANK_ADDR to bank control logic 230, provides the received row address ROW_ADDR to row address multiplexer 240, and provides the received column address COL_ADDR to column address latch 250.

Bank control logic 230 generates bank control signals in response to bank address BANK_ADDR. One of first through fourth bank row decoders 260a, 260b, 260c and 260d corresponding to bank address BANK_ADDR may be activated in response to the bank control signals, and one of first through fourth bank column decoders 270a, 270b, 270c and 270d corresponding to bank address BANK_ADDR may be activated in response to the bank control signals.

Row address multiplexer 240 receives row address ROW_ADDR from address register 220, and it receives a refresh row address REF_ADDR from refresh address generator 297. Row address multiplexer 240 selectively outputs row address ROW_ADDR or the refresh row address REF_ADDR. A row address output from row address multiplexer 240 may be applied to first through fourth bank row decoders 260a, 260b, 260c and 260d.

The activated one of first through fourth bank row decoders 260a, 260b, 260c and 260d decodes the row address output from row address multiplexer 240, and it activates a word line corresponding to the row address. For example, the activated bank row decoder may apply a word line driving voltage to the word line corresponding to the row address.

Column address latch 250 receives column address COL_ADDR from address register 220, and temporarily stores the received column address COL_ADDR. In some embodiments, in a burst mode, column address latch 250 generates column addresses that increment from the received column address COL_ADDR. Column address latch 250 applies the temporarily stored or generated column address to first through fourth bank column decoders 270a, 270b, 270c and 270d.

The activated one of first through fourth bank column decoders 270a, 270b, 270c and 270d decodes column address COL_ADDR output from column address latch 250, and controls input/output gating circuit 290 to output data corresponding to column address COL_ADDR.

I/O gating circuit 300 comprises circuitry for gating input/output data. I/O gating circuit 300 further comprises read data latches for storing data output from first through fourth bank arrays 280a, 280b, 280c and 280d, data inversion circuit for selectively inverting data stored in the read data latches and write drivers for writing data to first through fourth bank arrays 280a, 280b, 280c and 280d.

Data to be read from one bank array of first through fourth bank arrays 280a, 280b, 280c and 280d is sensed by a sense amplifier coupled to the one bank array, and then it is stored in the read data latches. The data stored in the read data latches is selectively inverted by the data inversion circuits and provided to data I/O buffer 299. The data inversion circuit receives first and second unit data from one of first through fourth bank sense amplifiers 285a, 285b, 285c and 285d through first data lines which are different from each other, determines whether to invert the second unit data during the first unit data is transmitted to data I/O buffer 299 and transmits the second unit data which is inverted or non-inverted to data I/O buffer 299 through the second data line after transmission of the first unit data.

Data I/O buffer 299 provides I/O gating circuit 300 with data block DTA from memory controller 100 and provides memory controller 100 with the read data from I/O gating circuit 300.

Control logic 210 controls operations of semiconductor memory device 200a. For example, control logic 210 generates control signals for semiconductor memory device 200a to perform a write operation and generates a read signal (or read command) RD for semiconductor memory device 200a to perform a read operation. Control logic 210 comprises a command decoder 211 that decodes a command CMD received from the memory controller and a mode register 212 that sets an operation mode of semiconductor memory device 200a. For example, command decoder 211 generates the control signals corresponding to the command CMD by decoding a write enable signal (/WE), a row address strobe signal (/RAS), a column address strobe signal (/CAS), a chip select signal (/CS), etc. Command decoder 211 may further receive a clock signal (CLK) and a clock enable signal (/CKE) for operating semiconductor memory device 200a in a synchronous manner. Control logic 210 controls refresh address generator 297 to generate refresh row address REF_ADDR.

Flag buffer 290 receives a second flag signal FLAG2, temporarily stores second flag signal FLAG2, and transmits second flag signal FLAG2 to memory controller 100 through separate pin 204. Second flag signal FLAG2 is provided from the data inversion circuit in I/O gating circuit 300 and indicates whether to invert the second unit data.

Figure 4:
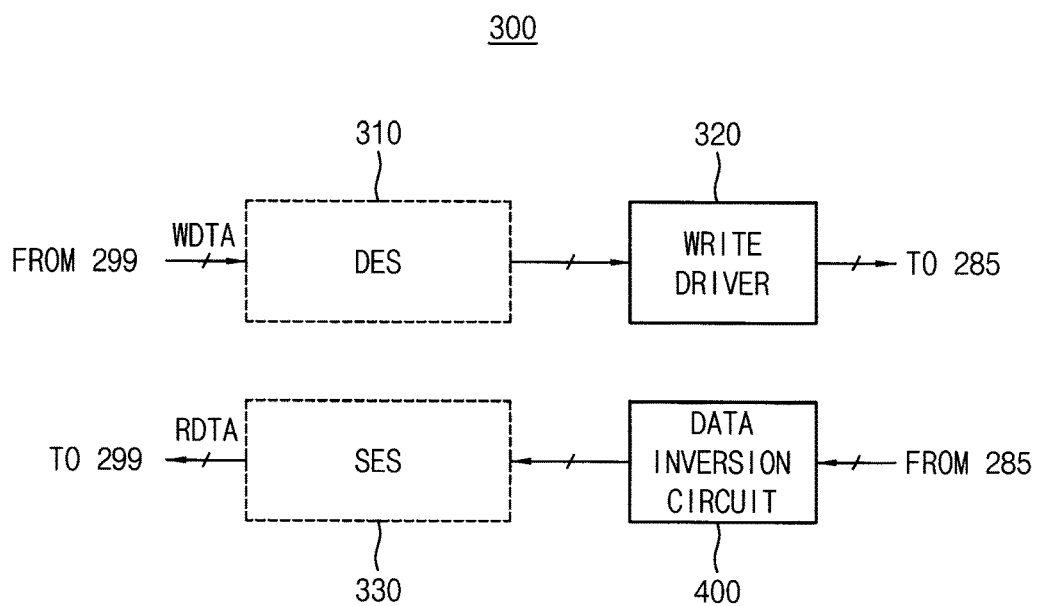
FIG. 4 is a block diagram illustrating an I/O gating circuit in FIG. 3 according to an embodiment of the inventive concept.

FIG. 4 is a block diagram illustrating the input/output (I/O) gating circuit in FIG. 3 according to an embodiment of the inventive concept.

Referring to FIG. 4, I/O gating circuit 300 comprises a deserializer 310, a write driver 320, a serializer 330 and at least one data inversion circuit 400.

Deserializer 310 deserializes write data block WDTA from data I/O buffer 299 to provide deserialized write data block to write driver 320. Write driver 320 writes multiple unit data in a target area of the memory cell array through one of first through fourth bank sense amplifiers 285. The at least one data inversion circuit 400 receives the first unit data and the second unit data stored in the memory cell array from one of first through fourth bank sense amplifiers 285 through different first data lines and determines whether to invert the second unit data during the first unit data is transmitted to data I/O buffer 299. Serializer 300 serializes the first unit data and the second unit data from data inversion circuit 400 to provide serialized read data block RDTA to data I/O buffer 299. Although one data inversion circuit 400 is illustrated in FIG. 4, multiple data inversion circuits constituting a data inversion circuit array may selectively invert unit data from one of first through fourth bank sense amplifiers 285 to provide the unit data which is inverted or non-inverted to the serializer 330.

Figure 5:
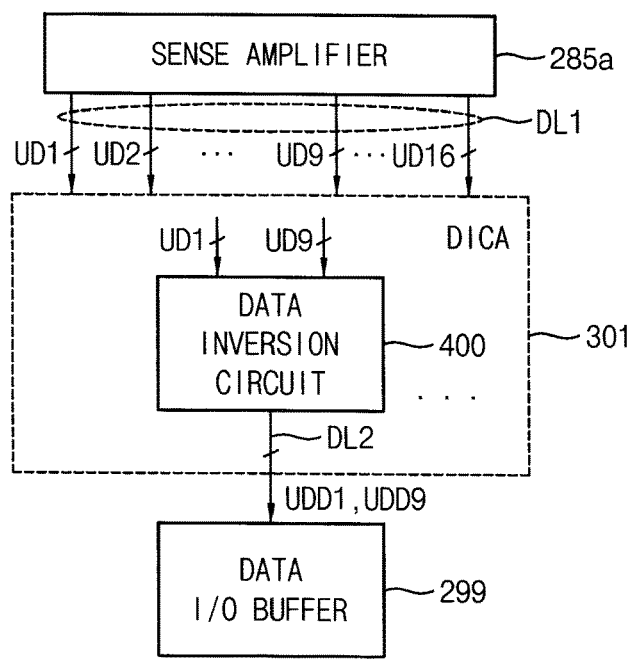
FIG. 5 illustrates a relationship of a first bank sense amplifier, a data inversion circuit and a data I/O buffer in FIG. 3.

FIG. 5 illustrates a relationship of the first bank sense amplifier, the data inversion circuit and the data I/O buffer in FIG. 3.

Referring to FIGS. 3 and 5, first bank sense amplifier 285a provides a data inversion circuit array 310 with multiple unit data UD1~UD16 through each of multiple first data lines DL1. Each of the unit data UD1~UD16 comprises multiple bits. Each of the unit data UD1~UD16 comprises one byte of 8 bits, but is not limited thereto.

Data inversion circuit array 301 comprises multiple data inversion circuits such as data inversion circuit 400. Data inversion circuit 400 receives a first unit data UD1 and a second unit data UD9 of the unit data UD1~UD16 through different first data lines DL1, determines whether to invert second unit data UD9 based on a Hamming distance between first and second unit data UD1 and UD9 during the first unit data UD1 is transmitted as a first output unit data UDD1 to data I/O buffer 299 through a second data line DL2, and transmits second unit data UD9 to data I/O buffer 299 as a second output unit data UDD9 through the second data line DL2.

Data inversion circuit 400 inverts second unit data UD9 and provides data I/O buffer 299 with the inverted second unit data UD9 where the Hamming distance between first and second unit data UD1 and UD9 is greater than a reference value. In addition, data inversion circuit 400 does not invert second unit data UD9 and provide data I/O buffer 299 with the non-inverted second unit data UD9 where the Hamming distance between first and second unit data UD1 and UD9 is less than or equal to the reference value. The reference value may be a half of each data width of the first and second unit data UD1 and UD9. Where each of the first and second unit data UD1 and UD9 comprises 8 bits, the reference value may be four.

Figure 6:
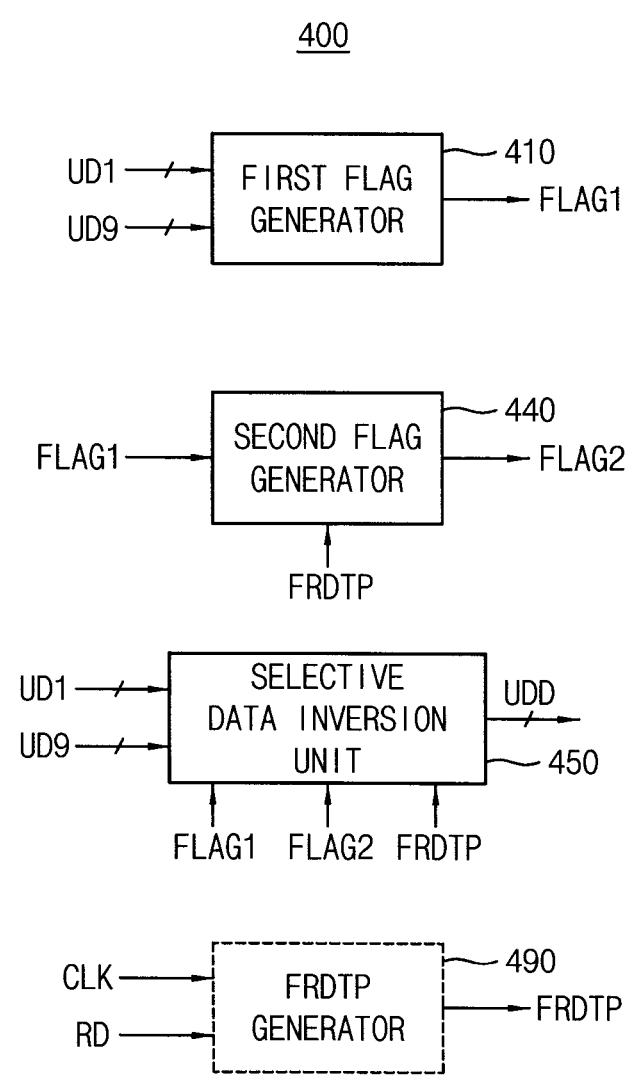
FIG. 6 is a block diagram illustrating the data inversion circuit in FIG. 5 according to an embodiment of the inventive concept.

FIG. 6 is a block diagram illustrating the data inversion circuit in FIG. 5 according to an embodiment of the inventive concept.

Referring to FIG. 6, data inversion circuit 400 comprises a first flag generator 410, a second flag generator 440, and a selective data inversion unit 450. Data inversion circuit 400 may further comprise a transmission signal generator 490.

First flag generator 410 receives first and second unit data UD1 and UD9 in parallel through the first data lines which are different and generates a first flag signal FLAG1 indicating whether to invert second unit data UD9, based on the Hamming distance between first and second unit data UD1 and UD9. The second flag generator 440 receives first flag signal FLAG1 and a transmission control signal FRDTP and generates second flag signal FLAG2 that determines whether to invert output unit data UDD based on first flag signal FLAG1 and transmission control signal FRDTP.

Selective data inversion unit 450 receives transmission control signal FRDTP, first flag signal FLAG1 and second flag signal FLAG2, transmits the first unit data UD1 which is non-inverted to data I/O buffer 299, and transmits second unit data UD9 which is inverted or non-inverted according to second flag signal FLAG2 to the data I/O buffer 29, based on transmission control signal FRDTP, first flag signal FLAG1 and second flag signal FLAG2. The serialize 330 in FIG. 4 serializes output unit data UDD to provide the serialized output unit data to data I/O buffer 299.

Transmission signal generator 490 generates transmission control signal FRDTP based on a clock signal CLK and a read command RD.

Figure 7:
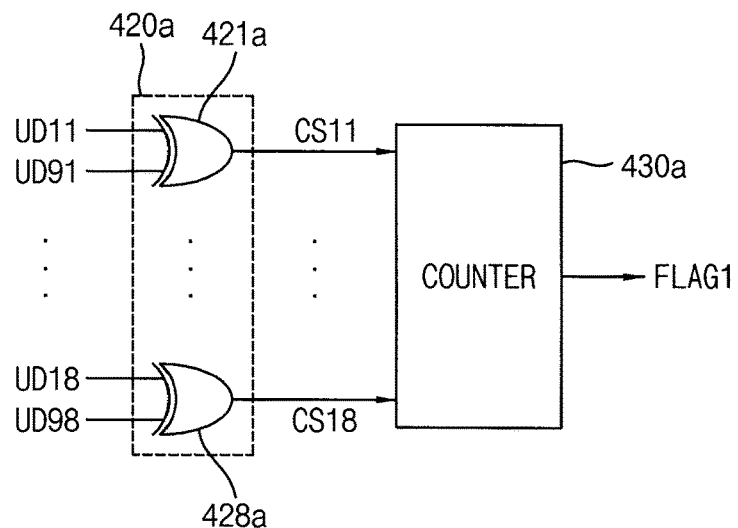
FIG. 7 is a circuit diagram illustrating a first flag generator in FIG. 6 according to an embodiment of the inventive concept.

FIG. 7 is a circuit diagram illustrating an example of the first flag generator in FIG. 6.

Referring to FIG. 7, a first flag generator 410a comprises a comparison circuit unit 420a and a counter 430a. Comparison circuit unit 420a comprises multiple exclusive OR gates 421a~428a and each of the exclusive OR gates 421a~428a performs an exclusive OR operation on the corresponding bits UD11, UD91, ..., D19, UD98 of the first and second unit data UD1 and UD9 to provide each of multiple comparison signals CS11~CS18. Counter 430a receives comparison signals CS11~CS18 and determines the number of non-matching pairs of bits among unit data UD11, UD91, ..., D19, UD98 to output first flag signal FLAG1.

Where corresponding bits UD11, UD91, ..., D19, UD98 are different from each other, comparison signals CS11~CS18 may have a first logic level (e.g., a logic high level). Alternatively, where each of the corresponding bits UD11, UD91, ..., D19, UD98 are the same as each other, each of the comparison signals CS11~CS18 may have a second logic level (e.g., a logic low level). Counter 430a counts the number of the comparison signals having the first logic level of the comparison signals CS11~CS18 and outputs first flag signal FLAG1 having the first logic level when the counted value is greater than the reference value. In addition, counter 430a counts the number of the comparison signals having the first logic level of the comparison signals CS11~CS18 and outputs first flag signal FLAG1 having the second logic level when the counted value is less than or equal to the reference value.

Figure 8:
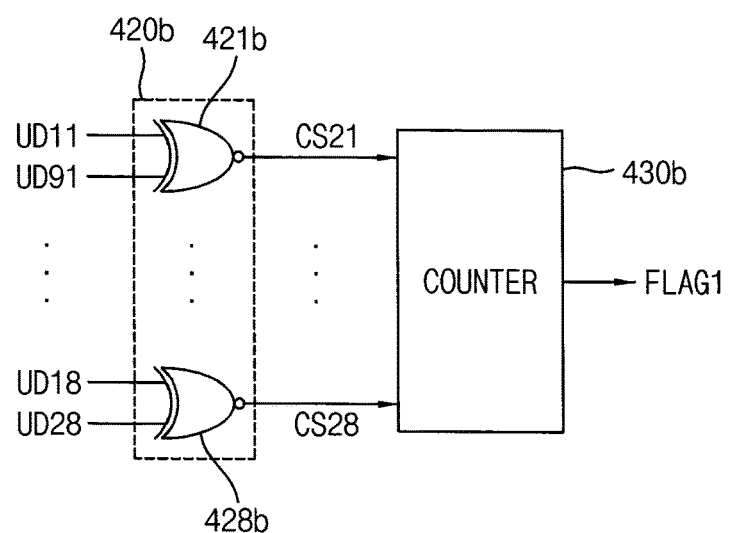
FIG. 8 is a circuit diagram illustrating the first flag generator in FIG. 6 according to another embodiment of the inventive concept.

FIG. 8 is a circuit diagram illustrating the first flag generator in FIG. 6 according to another embodiment of the inventive concept.

Referring to FIG. 8, a first flag generator 410b comprises a comparison circuit unit 420b and a counter 430b. Comparison circuit unit 420b comprises multiple exclusive NOR gates 421b~428b and each of the exclusive NOR gates 421b~428b performs an exclusive NOR operation on the corresponding bits UD11, UD91, ..., D19, UD98 of the first and second unit data UD1 and UD9 to provide each of multiple comparison signals CS21~CS28. Counter 430b receives comparison signals CS21~CS28 and counts the number of instances where corresponding bits do not match among UD11, UD91, ..., D19, UD98 to output first flag signal FLAG1. For example, where each pair of corresponding bits among UD11, UD91, ..., D19, UD98 is different from each other, each of the comparison signals CS21~CS28 may have a second logic level (e.g., a logic low level). For example, where each pair of corresponding bits among UD11, UD91, ..., D19, UD98 are the same, each of comparison signals CS21~CS28 may have a first logic level (e.g., a logic high level). Counter 430b counts the number of comparison signals having the second logic level of comparison signals CS21~CS28 and outputs first flag signal FLAG1 having the first logic level when the counted value is greater than the reference value. In addition, counter 430b counts the number of the comparison signals having the second logic level among comparison signals CS21~CS28 and outputs first flag signal FLAG1 having the second logic level when the counted value is less than or equal to the reference value.

Figure 9:
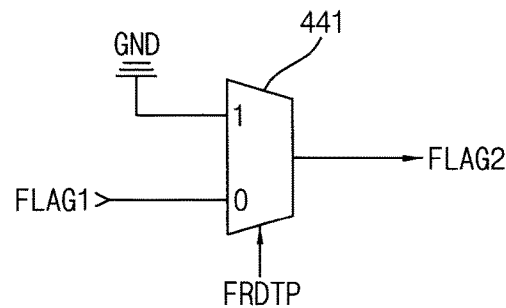
FIG. 9 is a circuit diagram illustrating a second flag generator in FIG. 6 according to an embodiment of the inventive concept.

FIG. 9 is a circuit diagram illustrating the second flag generator in FIG. 6 according to an embodiment of the inventive concept.

Referring to FIG. 9, second flag generator 440 comprises a multiplexer 441. Multiplexer 441 has a first input terminal receiving first flag signal FLAG1, a second input terminal coupled to a ground voltage, and a control terminal receiving transmission control signal FRDTP. Multiplexer 441 outputs second flag signal FLAG2. Where transmission control signal FRDTP has a logic high level, second flag signal FLAG2 may have a logic low level. Where transmission control signal FRDTP has a logic low level, second flag signal FLAG2 may have the same logic level as first flag signal FLAG1.

Figure 10:
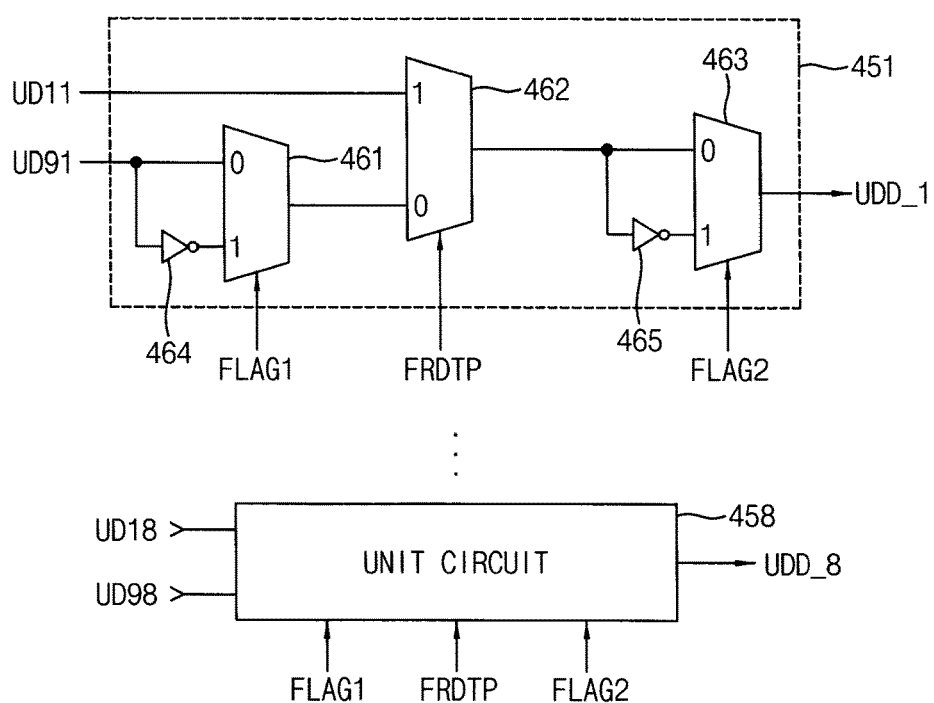
FIG. 10 is a circuit diagram illustrating a selective data inversion unit in FIG. 6 according to an embodiment of the inventive concept.

FIG. 10 is a circuit diagram illustrating the selective data inversion unit in FIG. 6 according to an embodiment of the inventive concept.

Referring to FIG. 10, selective data inversion unit 450 comprises multiple unit circuits 451~458 and each of unit circuits 451~458 receives each corresponding bits UD11, UD91, . . . , D19, UD98 of first and second unit data UD1 and UD9, first flag signal FLAG1, second flag signal FLAG2, and transmission control signal FRDTP.

Unit circuit 451 that receives corresponding bits UD11 and UD91 comprises first through third multiplexers 461, 462 and 463 and first and second inverters 464 and 465. First multiplexer 461 has a first input terminal receiving a first bit UD91 of second unit data UD9, a second input terminal receiving an inverted version of the first bit UD91 by first inverter 464, and a control terminal receiving first flag signal FLAG1. Second multiplexer 462 has a first input terminal receiving an output of the first multiplexer 461, a second input terminal receiving a first bit UD11 of the first unit data UD1, and a control terminal receiving transmission control signal FRDTP. Third multiplexer 463 has a first input terminal receiving an output of second multiplexer 462, a second input terminal receiving an inverted version of the output of second multiplexer 462 by the second inverter 465, and a control terminal receiving second flag signal FLAG2.

While first unit data UD1 is transmitted because transmission control signal FRDTP is at a logic high level, first bit UD11 of first unit data UD1 is provided as an output unit data UDD_1 because second flag signal FLAG2 is at a logic low level. In addition, while second unit data UD2 is transmitted because transmission control signal FRDTP is at a logic low level, first bit UD91 of second unit data UD9 which is inverted or non-inverted is provided as output unit data UDD_1 because second flag signal FLAG2 is at the same logic level as first flag signal FLAG1. Each of unit circuits 452~458 may have the same configuration as unit circuit 451, so a detailed description on each of the unit circuits 452~458 will be omitted in order to avoid redundant description.

Figure 11:
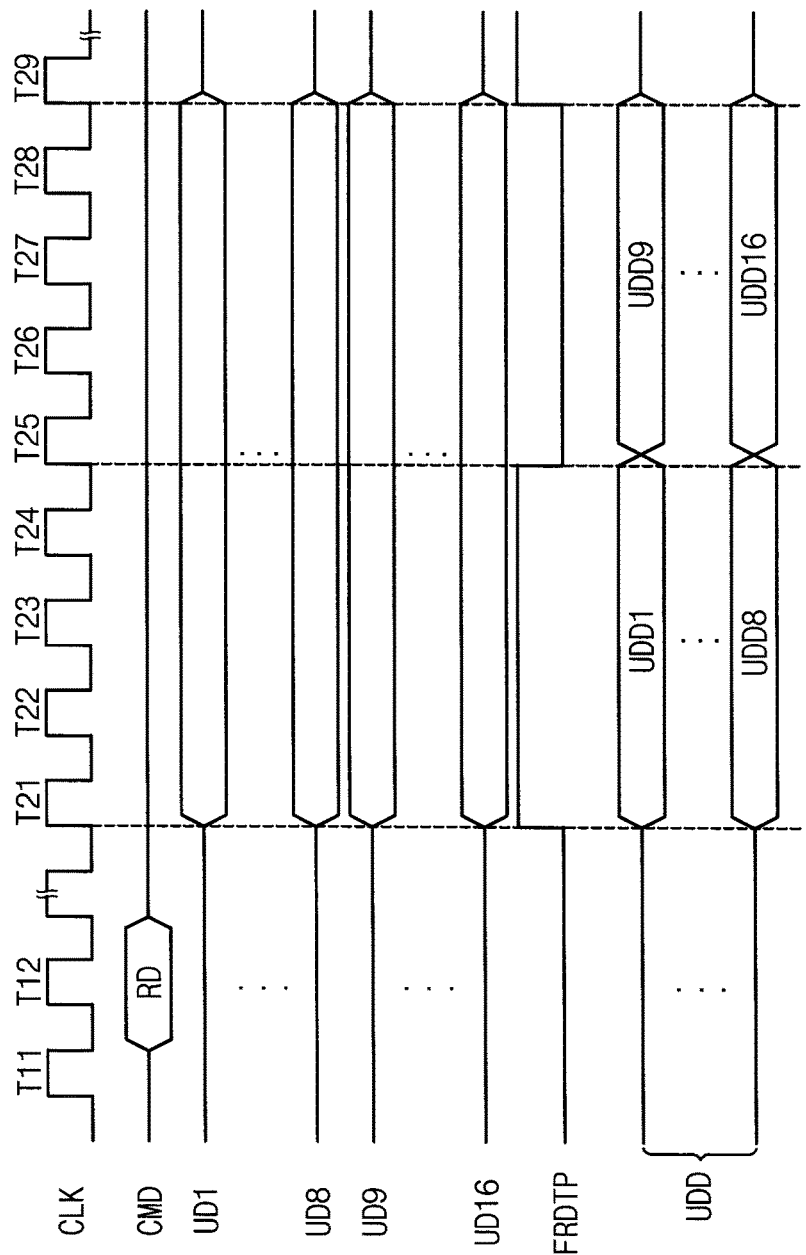
FIG. 11 is a timing diagram illustrating a read operation of the semiconductor memory device of FIG. 3 according to an embodiment of the inventive concept.

FIG. 11 is a timing diagram illustrating a read operation of the semiconductor memory device of FIG. 3. FIG. 11 illustrates data windows of the unit data UD1~UD16 and output unit data UDD1~UDD16 when semiconductor memory device 200a of FIG. 3 performs read operation.

Referring to FIGS. 3 through 11, control logic 210 provides read command RD to I/O gating circuit 300 between times T11~T12. Multiple unit data UD1~UD16 are in parallel provided to data inversion circuit array 301 of I/O gating circuit 300 through the bank sense amplifier and the different first data lines DL1 from one of first through fourth bank arrays 280a, 280b, 280c and 280d between times T21~T24. Multiple data inversion circuits in data inversion circuit array 301 transmit unit data UD1~UD8 which are non-inverted to data I/O buffer 299 as output unit data UDD1~UDD8, in response to transmission control signal FRDTP which is activated during times T21~T24.

While output unit data UDD1~UDD8 is transmitted to data I/O buffer 299, each of the data inversion circuits in data inversion circuit array 301 determines whether to invert each of the unit data UD9~UD16 by counting toggling number of the corresponding bits of each of the unit data UD1~UD8 and the unit data UD9~UD16. Each of the data inversion circuits in data inversion circuit array 301 selectively inverts each of the unit data UD9~UD16 according to a logic level of second flag signal FLAG2 to transmit each of the unit data UD9~UD16 which are selectively inverted to data I/O buffer 299 as output unit data UDD9~UDD16, in response to transmission control signal FRDTP which is deactivated during times T25~T28. Each of output unit data UDD1~UDD8 and corresponding each of output unit data UDD9~UDD16 are transmitted to data I/O buffer 299 through same second data line. Transmission control signal FRDTP may be activated at timing T29.

Figure 12:
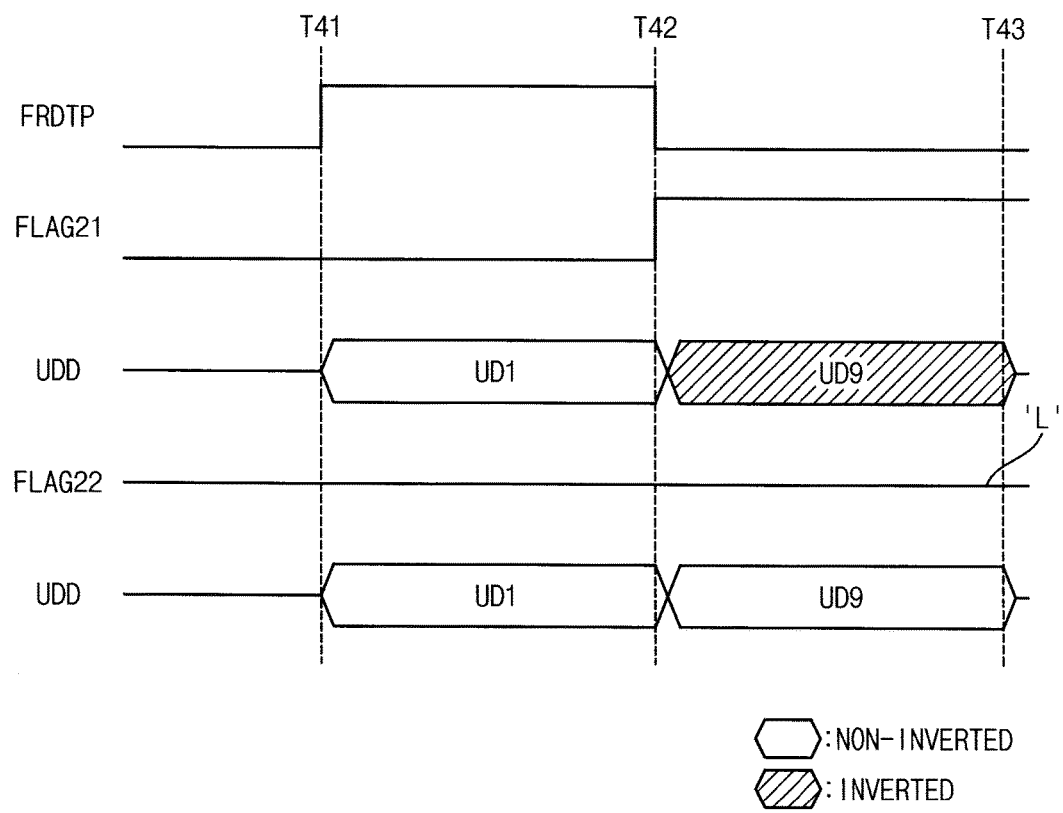
FIG. 12 illustrates the selective inversion of second unit data in response to a second flag signal according to an embodiment of the inventive concept.

FIG. 12 illustrates the selective inversion of second unit data in response to a second flag signal according to an embodiment of the inventive concept.

Referring to FIG. 12, during times T41~T42, transmission control signal FRDTP is at a logic high level and the first unit data UD1 which is non-inverted is transmitted to data I/O buffer 299 as the output unit data. During times T42~T43, transmission control signal FRDTP is at a logic low level and second unit data UD9 which is inverted in response to a second flag signal FLAG21 or non-inverted in response to a second flag signal FLAG22 is transmitted to data I/O buffer 299 as output unit data UDD. Therefore, data inversion circuit 400 determines whether to invert the second unit data during the first unit data is transmitted to data I/O buffer 299, and thus data inversion scheme may be adopted without deteriorating operating speed.

Figure 13:
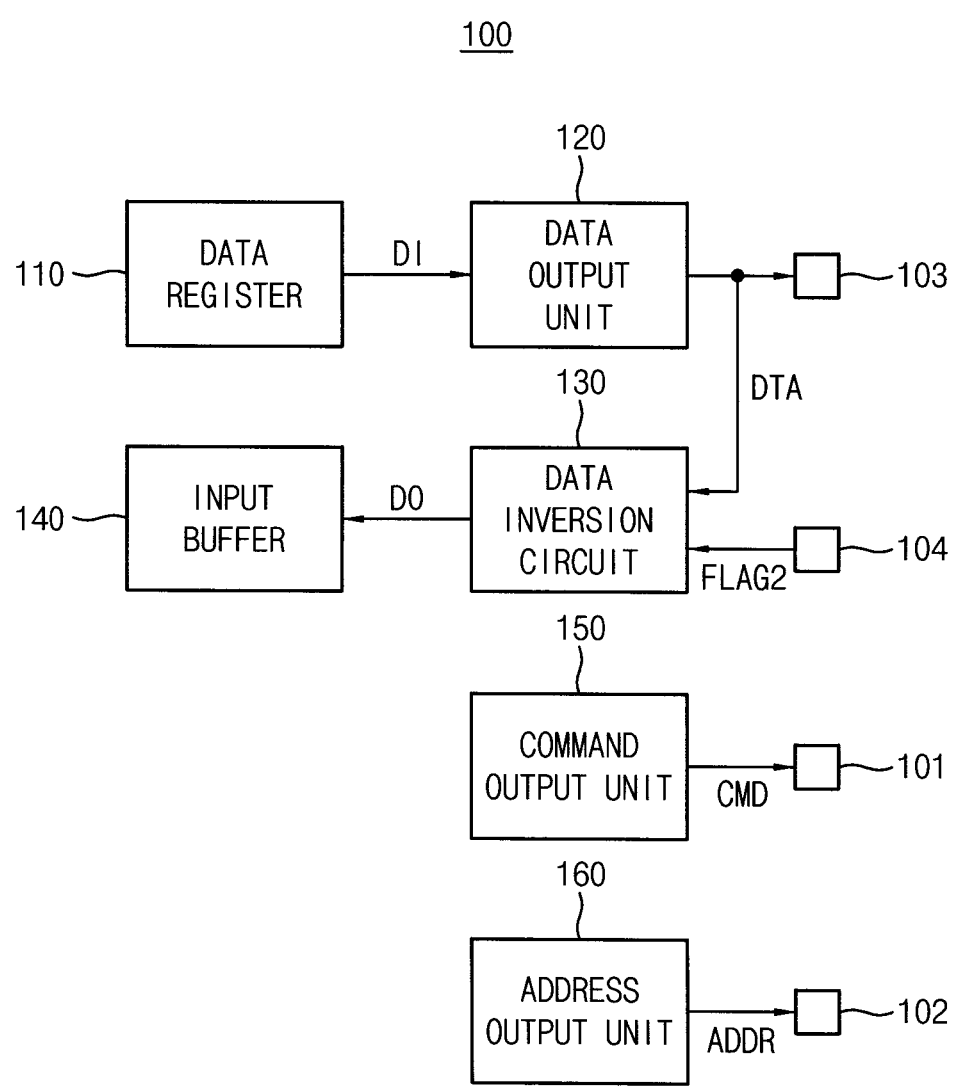
FIG. 13 is a block diagram illustrating the memory controller in FIG. 2 according to an embodiment of the inventive concept.

FIG. 13 is a block diagram illustrating the memory controller in FIG. 2 according to an embodiment of the inventive concept.

Referring to FIGS. 2 and 13, memory controller 100 comprises a data register 110, a data output unit 120, a data inversion circuit 130, an input buffer 140, a command output unit 150, and an address output unit 160.

Data register 110 stores input data DI from a central processing unit in host 20 in FIG. 1. Input data DI stored in the data register 110 may be continuously (or sequentially) output to data output unit 120.

Data output unit 120 provides semiconductor memory device 200a with data block DTA comprising multiple unit data via the data pin 103 based on input data DI continuously output from the data register 110.

Data inversion circuit 130 selectively inverts each of unit data in data block DTA received via the data pin 103 from semiconductor memory device 200a according to a logic level of second flag signal FLAG2 received through separate pin 104, and provides output data DO to input buffer 140. Input buffer 140 buffers output data DO from data inversion circuit 130. The buffered output data DO may be used in a circuit block in memory controller 100 or input to an external cache memory or host 20.

Command output unit 1560 provides command signal CMD to semiconductor memory device 200a through the command pin 101 in response to a signal from host 20. Address output unit 160 provides address signal ADDR to semiconductor memory device 200a through address pin 102 in response to a signal from host 20.

Figure 14:
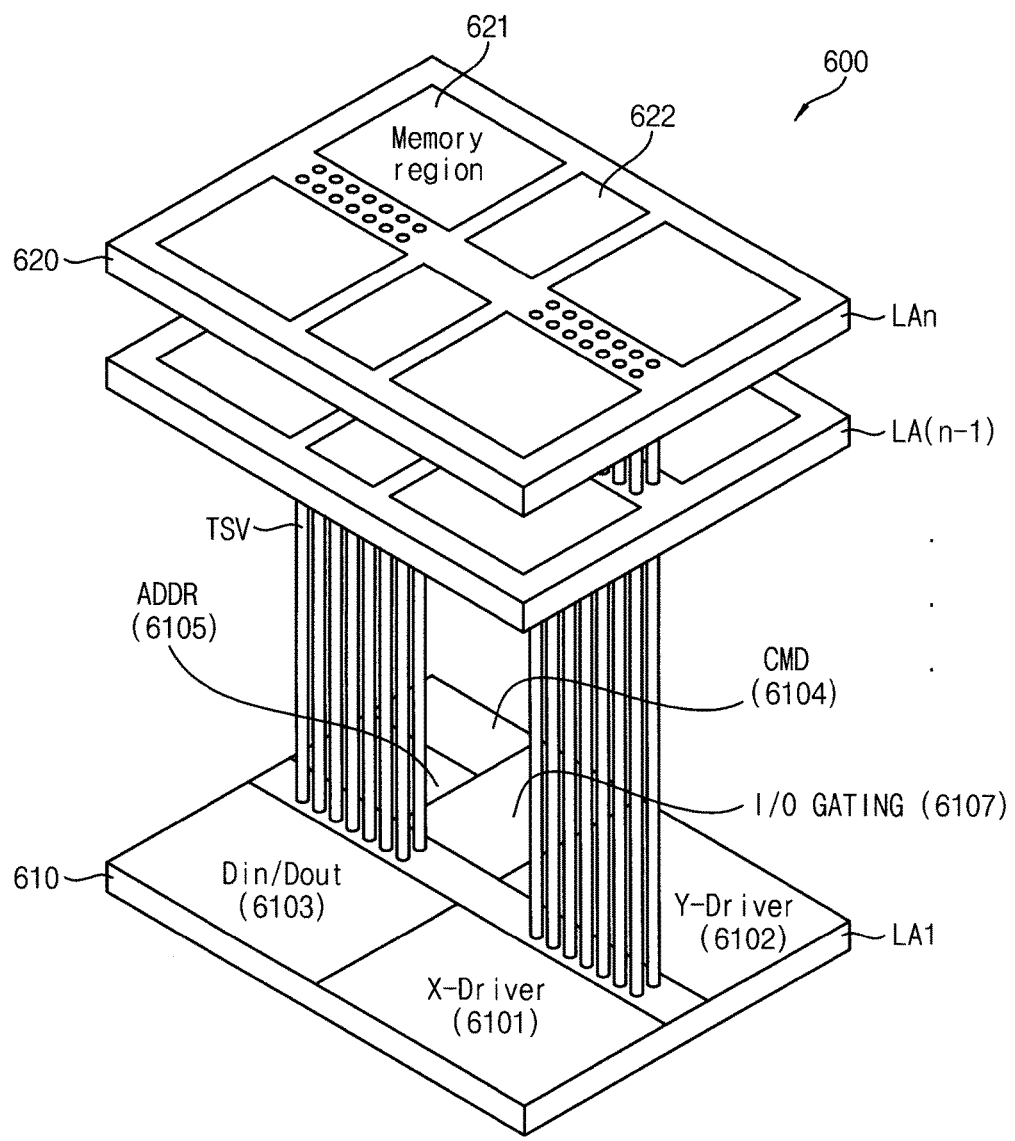
FIG. 14 is a diagram illustrating a semiconductor memory device according to an embodiment of the inventive concept.

FIG. 14 is a diagram illustrating a semiconductor memory device 600 according to an embodiment of the inventive concept.

Referring to FIG. 14, semiconductor memory device 600 comprises multiple first through n-th semiconductor integrated circuit layers LA1 through LAn, in which the lowest first semiconductor integrated circuit layer LA1 is assumed to be an interface or control chip and the other semiconductor integrated circuit layers LA2 through LAn are assumed to be slave chips, comprising core memory chips. Semiconductor integrated circuit layers LA1 through LAn transmit and receive signals therebetween through through-silicon-vias (TSVs). The lowest first semiconductor integrated circuit layer LA1 as the interface or control chip communicates with an external memory controller through a conductive structure formed on an external surface. A description will be made regarding the structure and operation of the semiconductor memory device 600 by mainly using the first semiconductor integrated circuit layer LA1 or 610 as the interface or control chip and the n-th semiconductor integrated circuit layer LAn or 620 as the slave chip.

First semiconductor integrated circuit layer 610 comprises various peripheral circuits for driving memory regions 621 provided in the n-th semiconductor integrated circuit layer 620. For example, first semiconductor integrated circuit layer 610 comprises a row (X)-driver 6101 for driving word lines of a memory, a column (Y)-driver 6102 for driving bit lines of the memory, a data input/output unit (Din/Dout) 6103 for controlling input/output of data, a command buffer (CMD) 6104 for receiving a command CMD from outside and buffering the command CMD, and an address buffer (ADDR) 6105 for receiving an address from outside and buffering the address.

First semiconductor integrated circuit layer 610 further comprises an I/O gating circuit 6107 which comprises a data inversion circuit. The data inversion circuit receives a first unit data and a second unit data from the memory region 621 through different first data lines, determines whether to invert the second unit data during the first unit data is transmitted to the data input/output unit 6103 through a second data line and transmits the second unit data which is inverted or non-inverted to data input/output unit 6103 through the second data line after transmission of the first unit data. Therefore, the data inversion circuit determines whether to invert the second unit data during the first unit data is transmitted, and thus data inversion scheme may be adopted without deteriorating operating speed.

The n-th semiconductor integrated circuit layer 620 comprises the memory regions 621 comprising memory cell arrays and peripheral circuit regions 622 in which peripheral circuits for reading/writing data of the memory regions 621, e.g., a row decoder, a column decoder, a bit line sense amplifier, etc. (not illustrated) are arranged.

Figure 15:
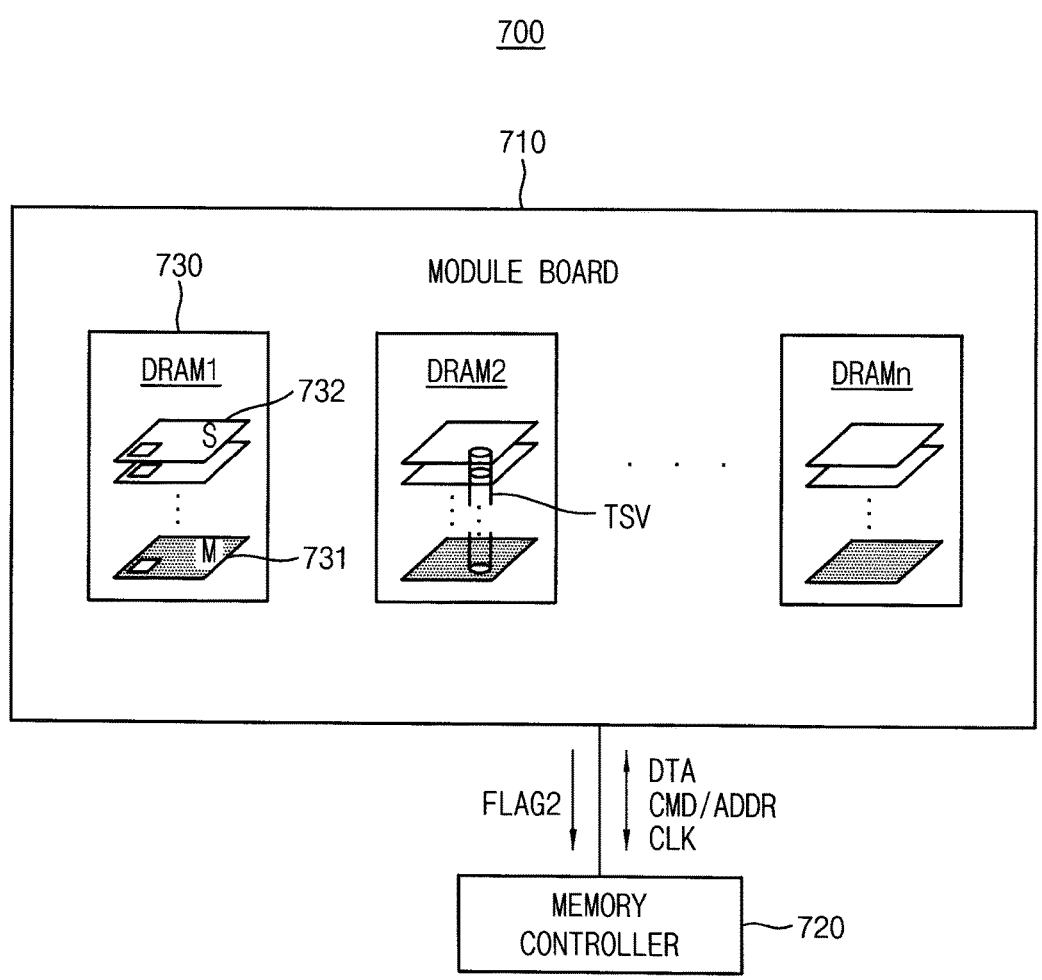
FIG. 15 illustrates a memory system comprising a semiconductor memory device according to an embodiment of the inventive concept.

FIG. 15 illustrates a memory system comprising the semiconductor memory device according to an embodiment of the inventive concept.

Referring to FIG. 15, a memory system 700 comprises a memory module 710 and a memory controller 720. Memory module 710 comprises at least one semiconductor memory device 730 mounted on a module board. Semiconductor memory device 730 employs semiconductor memory device 200a of FIG. 3. For example, semiconductor memory device 730 may be constructed as a DRAM chip. In addition, semiconductor memory device 730 comprises a stack of semiconductor chips. In this case, the semiconductor chips comprise at least one master chip 731 and at least one slave chip 732. Signal transfer between the semiconductor chips occurs via through-silicon vias TSV.

Master chip 731 and slave chip 732 employs semiconductor memory device 200a of FIG. 3. Therefore, each of master chip 731 and slave chip 732 comprises data inversion circuit 400 of FIG. 6. The data inversion circuit receives a first unit data and a second unit data from a memory cell array through different first data lines, determines whether to invert the second unit data during the first unit data is transmitted to a data I/O buffer through a second data line and transmits the second unit data which is inverted or non-inverted to the data I/O buffer through the second data line after transmission of the first unit data. Therefore, the data inversion circuit determines whether to invert the second unit data during the first unit data is transmitted, and thus data inversion scheme may be adopted without deteriorating operating speed.

Memory module 710 communicates with memory controller 720 via a system bus. Data block DTA comprising multiple unit data, a command/address CMD/ADDR, and a clock signal CLK may be transmitted and received between memory module 710 and memory controller 720 via the system bus. In addition, the semiconductor memory device 730 transmits second flag signal FLAG2 indicating whether to invert each of the unit data to memory controller 720 via the system bus.

Figure 16:
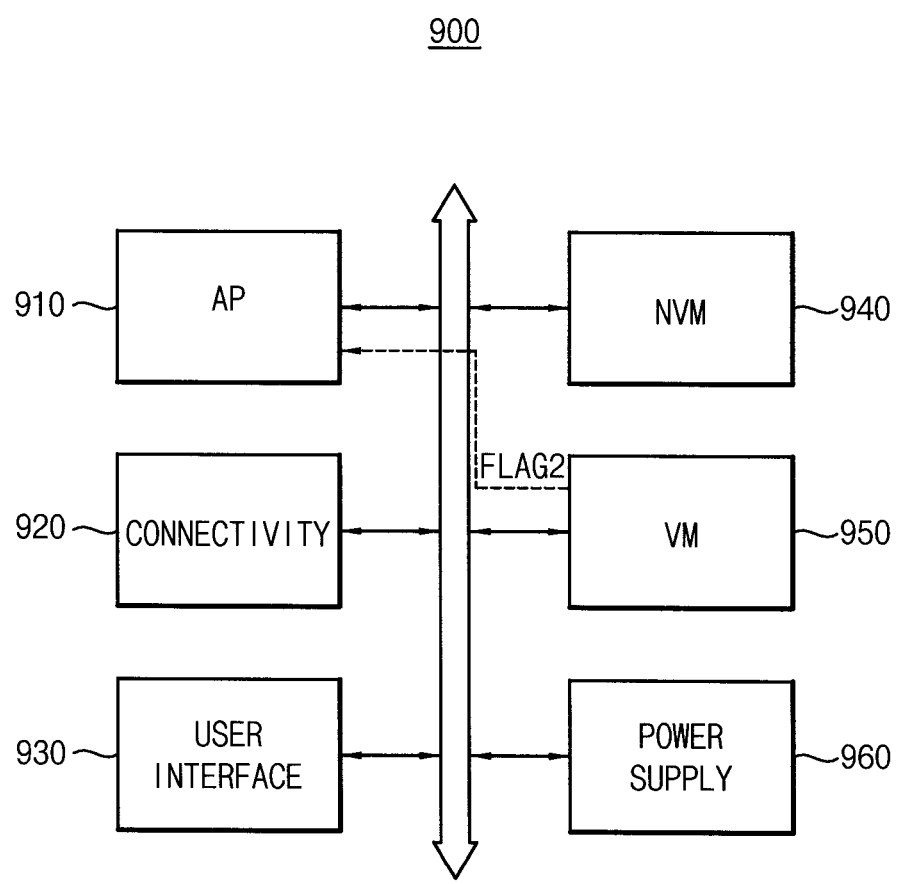
FIG. 16 is a block diagram illustrating a mobile system comprising a semiconductor memory device according to an embodiment of the inventive concept.

FIG. 16 is a block diagram illustrating a mobile system 900 comprising a semiconductor memory device according to an embodiment of the inventive concept.

Referring to FIG. 16, mobile system 900 comprises an application processor 910, a connectivity unit 920, a semiconductor memory device 950, a nonvolatile memory device 940, a user interface 930, and a power supply 960. Mobile system 900 may be, for instance, a mobile phone, a smart phone, a personal digital assistant (PDA), a portable multimedia player (PMP), a digital camera, a music player, a portable game console, a navigation system, etc.

Application processor 910 executes applications, such as a web browser, a game application, a video player, etc. In some embodiments, application processor 910 comprises a single core or multiple cores. For example, application processor 910 may be a multi-core processor, such as a dual-core processor, a quad-core processor, a hexa-core processor, etc. Application processor 910 comprises an internal or external cache memory.

Connectivity unit 920 performs wired or wireless communication with an external device. For example, connectivity unit 920 performs Ethernet communication, near field communication (NFC), radio frequency identification (RFID) communication, mobile telecommunication, memory card communication, universal serial bus (USB) communication, etc. In some embodiments, connectivity unit 920 comprises a baseband chipset that supports communications, such as global system for mobile communications (GSM), general packet radio service (GPRS), wideband code division multiple access (WCDMA), high speed downlink/uplink packet access (HSxPA), etc.

Semiconductor memory device 950 stores data processed by application processor 910 or operate as a working memory. Semiconductor memory device 950 may be, for instance, a DRAM, a DDR SDRAM, an LPDDR SDRAM, a GDDR SDRAM, or an RDRAM.

Semiconductor memory device 950 employs semiconductor memory device 200a of FIG. 3. Therefore, semiconductor memory device 950 comprises data inversion circuit 400 of FIG. 6. The data inversion circuit receives a first unit data and a second unit data from a memory cell array through different first data lines, determines whether to invert the second unit data during the first unit data is transmitted to a data I/O buffer through a second data line and transmits the second unit data which is inverted or non-inverted to the data I/O buffer through the second data line after transmission of the first unit data. Therefore, the data inversion circuit determines whether to invert the second unit data during the first unit data is transmitted, and thus data inversion scheme may be adopted without deteriorating operating speed. Semiconductor memory device 950 transmits second flag signal FLAG2 indicating whether to invert each of the unit data to application processor 910.

Nonvolatile memory device 940 stores a boot image for booting mobile system 900. For example, nonvolatile memory device 940 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

User interface 930 comprises at least one input device, such as a keypad, a touch screen, etc., and at least one output device, such as a speaker, a display device, etc. Power supply 960 supplies a power supply voltage to mobile system 900. In some embodiments, mobile system 900 may further comprise a camera image processor (CIS), and/or a storage device, such as a memory card, a solid state drive (SSD), a hard disk drive (HDD), a CD-ROM, etc.

Mobile system 900 and/or components of mobile system 900 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 17:
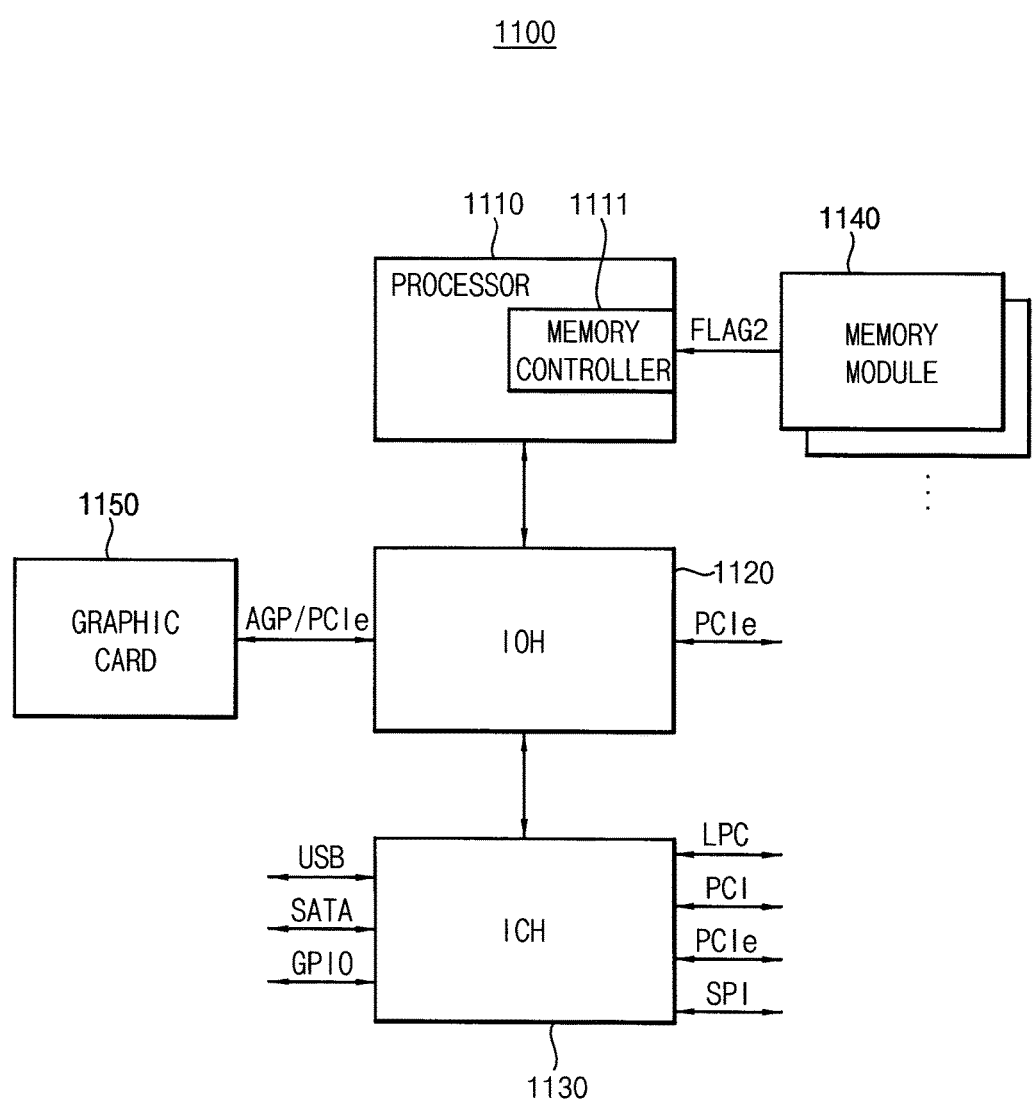
FIG. 17 is a block diagram illustrating a computing system comprising a semiconductor memory device according to an embodiment of the inventive concept.

FIG. 17 is a block diagram illustrating a computing system 1100 comprising a semiconductor memory device according to an embodiment of the inventive concept.

Referring to FIG. 17, computing system 1100 comprises a processor 1110, an input/output hub (IOH) 1120, an input/output controller hub (ICH) 1130, at least one memory module 1140 and a graphics card 1150. Computing system 1100 may be, for instance, a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

Processor 1110 performs various computing functions, such as executing specific software for performing specific calculations or tasks. For example, processor 1110 may be a microprocessor, a central process unit (CPU), a digital signal processor, or the like. In some embodiments, processor 1110 comprises a single core or multiple cores. For example, processor 1110 may be a multi-core processor, such as a dual-core processor, a quad-core processor, a hexa-core processor, etc. Although FIG. 17 illustrates computing system 1100 with one processor 1110, in some embodiments, computing system 1100 comprises multiple processors. Processor 1110 typically comprises an internal or external cache memory.

Processor 1110 comprises a memory controller 1111 for controlling operations of memory module 1140. Memory controller 1111 in processor 1110 may be referred to as an integrated memory controller (IMC). A memory interface between memory controller 1111 and memory module 1140 may be implemented with a single channel comprising multiple signal lines, or it may bay be implemented with multiple channels, to each of which at least one memory module 1140 may be coupled. In some embodiments, memory controller 1111 may be located inside input/output hub 1120, which may be referred to as memory controller hub (MCH).

Memory module 1140 comprises multiple semiconductor memory devices that store data provided from memory controller 1111. The semiconductor memory devices receives data mask signal DM from memory controller 1111. Each of the semiconductor memory devices employs semiconductor memory device 200a of FIG. 3. Therefore, each of the memory devices comprises data inversion circuit 400 of FIG. 6. The data inversion circuit receives a first unit data and a second unit data from a memory cell array through different first data lines, determines whether to invert the second unit data during the first unit data is transmitted to a data I/O buffer through a second data line and transmits the second unit data which is inverted or non-inverted to the data I/O buffer through the second data line after transmission of the first unit data. Therefore, the data inversion circuit determines whether to invert the second unit data during the first unit data is transmitted, and thus data inversion scheme may be adopted without deteriorating operating speed. In addition, each of the semiconductor memory devices transmits second flag signal FLAG2 indicating whether to invert each of the unit data to memory controller 1111.

Input/output hub 1120 manages data transfer between processor 1110 and devices, such as graphics card 1150. Input/output hub 1120 may be coupled to processor 1110 via any of various types of interfaces. For example, the interface between processor 1110 and input/output hub 1120 may be a front side bus (FSB), a system bus, a HyperTransport, a lightning data transport (LDT), a QuickPath interconnect (QPI), a common system interface (CSI), etc. Although FIG. 21 illustrates computing system 1100 comprising one input/output hub 1120, in some embodiments, computing system 1100 comprises multiple input/output hubs.

Input/output hub 1120 provides various interfaces with the devices. For example, input/output hub 1120 provides an accelerated graphics port (AGP) interface, a peripheral component interface-express (PCIe), a communications streaming architecture (CSA) interface, etc.

Graphics card 1150 may be coupled to input/output hub 1120 via AGP or PCIe. Graphics card 1150 controls a display device (not shown) for displaying an image. Graphics card 1150 comprises an internal processor for processing image data and an internal semiconductor memory device. In some embodiments, input/output hub 1120 comprises an internal graphics device along with or instead of graphics card 1150 outside graphics card 1150. The graphics device included in input/output hub 1120 may be referred to as integrated graphics. Further, input/output hub 1120 comprising the internal memory controller and the internal graphics device may be referred to as a graphics and memory controller hub (GMCH).

Input/output controller hub 1130 performs data buffering and interface arbitration to efficiently operate various system interfaces. Input/output controller hub 1130 may be coupled to input/output hub 1120 via an internal bus, such as a direct media interface (DMI), a hub interface, an enterprise Southbridge interface (ESI), PCIe, etc. Input/output controller hub 1130 may provide various interfaces with peripheral devices. For example, input/output controller hub 1130 may provides a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, processor 1110, input/output hub 1120 and input/output controller hub 1130 may be implemented as separate chipsets or separate integrated circuits. In other embodiments, at least two of processor 1110, input/output hub 1120, and input/output controller hub 1130 may be implemented as a single chipset.

As indicated by the foregoing, in certain embodiments of the inventive concept, a semiconductor memory device comprises a data inversion circuit that receives a first unit data and a second unit data from a memory cell array through different first data lines, determines whether to invert the second unit data while the first unit data is transmitted to a data I/O buffer through a second data line, and transmits the second unit data which is inverted or non-inverted to the data I/O buffer through the second data line after transmission of the first unit data. Therefore, the data inversion circuit determines whether to invert the second unit data while the first unit data is transmitted, and thus data inversion scheme may be adopted without deteriorating operating speed.

The inventive concept may be applied to, among other things, systems using memory controllers and semiconductor memory devices. It may also be applied to systems such as be a mobile phones, smart phones, personal digital assistants (PDAs), portable multimedia players (PMPs), digital cameras, music players, portable game consoles, navigation systems, etc.

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined in the claims.

What is claimed is:

1. A semiconductor memory device, comprising:
    a memory cell array; and
    a data inversion circuit configured to perform inversion and configured to:
    receive a first unit data and a second unit data stored in the memory cell array through different first data lines connected to the data inversion circuit,
    determine, while the first unit data is serially transmitted to a data input/output (I/O) buffer through a second data line connected to the data inversion circuit, whether to invert the second unit data based on a Hamming distance between the first unit data and the second unit data, and
    transmit serially the inverted or non-inverted second unit data to the data I/O buffer through the second data line through which the first unit data is transmitted,
    wherein the data inversion circuit comprises:
        a first flag generator configured to generate a first flag signal that determines whether to invert the second unit data while the first unit data is transmitted, based on the Hamming distance;
        a second flag generator configured to generate a second flag signal based on a transmission control signal and the first flag signal; and
        a selective data inversion unit configured to selectively invert the second unit data to be provided to the data I/O buffer, based on the transmission control signal, the first flag signal and the second flag signal,
    wherein the selective data inversion unit comprises multiple unit circuits each configured to receive corresponding bits of the first unit data and the second unit data,
    wherein each of the unit circuits comprises:
        a first multiplexer that has a first input terminal receiving a bit of the second unit data, a second input terminal receiving an inverted version of the bit of the second unit data and a control terminal receiving the first flag signal;
        a second multiplexer that has a first input terminal receiving an output of the first multiplexer, a second input terminal receiving a bit of the first unit data and a control terminal receiving the transmission control signal; and
        a third multiplexer that has a first input terminal receiving an output of the second multiplexer, a second input terminal receiving an inverted version of the output of the second multiplexer, and a control terminal receiving the second flag signal, and
    wherein the second flag generator is configured to output the second flag signal having a low level in response to the transmission control signal indicating that the first unit data is transmitted, and configured to output the second flag signal having the same logic level as the first flag signal in response to the transmission control signal indicating that the second unit data is transmitted.

2. The semiconductor memory device of claim 1, wherein the data inversion circuit inverts the second unit data when the Hamming distance is greater than one half of a data width of each of the first unit data and the second unit data.

3. The semiconductor memory device of claim 1, wherein the data inversion circuit does not invert the second unit data when the Hamming distance is less than or equal to one half of a data width of each of the first unit data and the second unit data.

4. The semiconductor memory device of claim 1, wherein the first flag signal has a first logic level when the Hamming distance is greater than one half of the data width of each of the first unit data and the second unit data.

5. The semiconductor memory device of claim 4, wherein when the second flag signal has a second logic level different from the first logic level, the first unit data is serially transmitted to the data I/O buffer based on the transmission control signal.

6. The semiconductor memory device of claim 4, wherein when the second flag signal has the same logic level as the first flag signal, the second unit data is serially transmitted to the data I/O buffer based on the transmission control signal.

7. The semiconductor memory device of claim 1, wherein the first flag generator comprises:
    a comparison circuit unit configured to generate multiple comparison signals each indicating whether corresponding bits of the first unit data and the second unit data are the same; and
    a counter coupled to the comparison circuit unit, the counter configured to receive the comparison signals, configured to count a toggling number and configured to provide the first flag signal, and
    wherein the comparison circuit unit comprises multiple exclusive OR (XOR) gates, each configured to perform an XOR operation on the corresponding bits of the first unit data and the second unit data to provide the comparison signals.

8. The semiconductor memory device of claim 1, wherein the second flag generator comprises a multiplexer that has a first input terminal receiving the first flag signal, a second input terminal coupled to a ground voltage, and a control terminal receiving the transmission control signal.

9. The semiconductor memory device of claim 1, wherein the transmission control signal has a first logic level while the first unit data is transmitted and the transmission control signal has a second logic level different from the first logic level while the second unit data is transmitted.

10. The semiconductor memory device of claim 1,
wherein the data inversion circuit further comprises a transmission signal generator configured to generate the transmission control signal based on a clock signal and a read command.

11. The semiconductor memory device of claim 1, further comprising:
a serializer configured to serialize bits of the first unit data and the second unit data to provide the serialized bits to the data I/O buffer.

12. The semiconductor memory device of claim 1, further comprising:
a flag buffer configured to receive the second flag signal to provide the second flag signal to an external memory controller.

13. A memory system, comprising:
at least one semiconductor memory device; and
a memory controller configured to control the at least one semiconductor memory device,
wherein the at least one semiconductor memory device comprises:
a memory cell array; and
a data inversion circuit configured to perform inversion and configured to:
receive a first unit data and a second unit data stored in the memory cell array through different first data lines connected to the data inversion circuit,
determine, while the first unit data is serially transmitted to a data input/output (I/O) buffer through a second data line connected to the data inversion circuit, whether to invert the second unit data based on a Hamming distance between the first unit data and the second unit data, and
transmit serially the inverted or non-inverted second unit data to the data I/O buffer through the second data line through which the first unit data is transmitted,
wherein the data inversion circuit comprises:
a first flag generator configured to generate a first flag signal that determines whether to invert the second unit data while the first unit data is transmitted, based on the Hamming distance;
a second flag generator configured to generate a second flag signal based on a transmission control signal and the first flag signal; and
a selective data inversion unit configured to selectively invert the second unit data to be provided to the data I/O buffer, based on the transmission control signal, the first flag signal and the second flag signal,
wherein the selective data inversion unit comprises multiple unit circuits each configured to receive corresponding bits of the first unit data and the second unit data,
wherein each of the unit circuits comprises:
a first multiplexer that has a first input terminal receiving a bit of the second unit data, a second input terminal receiving an inverted version of the bit of the second unit data and a control terminal receiving the first flag signal;
a second multiplexer that has a first input terminal receiving an output of the first multiplexer, a second input terminal receiving a bit of the first unit data and a control terminal receiving the transmission control signal; and
a third multiplexer that has a first input terminal receiving an output of the second multiplexer, a second input terminal receiving an inverted version of the output of the second multiplexer, and a control terminal receiving the second flag signal, and
wherein the second flag generator is configured to output the second flag signal having a low level in response to the transmission control signal indicating that the first unit data is transmitted, and configured to output the second flag signal having the same logic level as the first flag signal in response to the transmission control signal indicating that the second unit data is transmitted.

14. A method of operating a memory device, comprising:
receiving, at a data inversion circuit configured to perform inversion, a first unit data and a second unit data stored in a memory cell array through different first data lines connected to the data inversion circuit;
determining, while the first unit data is serially transmitted to a data input/output (I/O) buffer through a second data line connected to the data inversion circuit, whether to invert the second unit data based on a Hamming distance between the first unit data and the second unit data;
transmitting serially the inverted or non-inverted second unit data to the data I/O buffer through the second data line through which the first unit data is transmitted;
generating a first flag signal that determines whether to invert the second unit data while the first unit data is transmitted, based on the Hamming distance;
generating a second flag signal based on a transmission control signal and the first flag signal; and
selectively inverting the second unit data to be provided to the data I/O buffer, based on the transmission control signal, the first flag signal and the second flag signal,
wherein the second flag signal has a low level in response to the transmission control signal indicating that the first unit data is transmitted, and the second flag signal has the same logic level as the first flag signal in response to the transmission control signal indicating that the second unit data is transmitted.

15. The method of claim 14, further comprising:
inverting the second unit data as a consequence of determining that the Hamming distance is greater than one half of a data width of each of the first unit data and the second unit data.

16. The method of claim 15, further comprising:
not inverting the second unit data as a consequence of determining that the Hamming distance is less than or equal to one half of a data width of each of the first unit data and the second unit data.

17. The method of claimer 14,
wherein the first flag signal has a first logic level when the Hamming distance is greater than one half of the data width of each of the first unit data and the second unit data.

* * * * *